United States Patent
Scharlé

(10) Patent No.: US 9,661,832 B2
(45) Date of Patent: May 30, 2017

(54) FISHING LURE (71) Applicant: Matt Scharlé, Haddonfield, NJ (US)

(72) Inventor: Matt Scharlé, Haddonfield, NJ (US)

( * ) Notice: Subject to any disclaimer, the term of this patent is extended or adjusted under 35 U.S.C. 154(b) by 297 days.

(21) Appl. No.: 14/660,358

(22) Filed: Mar. 17, 2015

(65) Prior Publication Data
US 2015/0264902 A1 Sep. 24, 2015

Related U.S. Application Data (60) Provisional application No. 61/967,390, filed on Mar. 18, 2014.

(51) Int. Cl.
*A01K 85/00* (2006.01)
*A01K 85/01* (2006.01)
*A01K 85/16* (2006.01)

(52) U.S. Cl.
CPC .............. *A01K 85/01* (2013.01); *A01K 85/16* (2013.01)

(58) Field of Classification Search
USPC .................................................. 43/42.31, 42
See application file for complete search history.

(56) References Cited

U.S. PATENT DOCUMENTS

| | | | |
|---|---|---|---|
| 2,116,994 A | 5/1938 | Bear | |
| 2,520,444 A | 8/1950 | Smith | |
| 2,563,522 A | 8/1951 | Fisher | |
| 2,909,863 A | 10/1959 | Rector et al. | |
| 3,172,227 A | 3/1965 | Mackey | |
| 3,885,340 A | 5/1975 | Volenec | |
| 3,896,580 A | 7/1975 | Williams, Jr. | |
| 4,380,132 A * | 4/1983 | Atkinson | A01K 85/01 43/26.2 |
| 4,453,335 A | 6/1984 | Smith | |
| 5,426,886 A * | 6/1995 | Stanley | A01K 85/01 43/42.31 |
| 6,108,962 A * | 8/2000 | Barron | A01K 85/00 43/17.6 |
| 6,108,963 A * | 8/2000 | Lucas | A01K 85/01 43/26.2 |
| 6,199,313 B1 * | 3/2001 | Moore | A01K 85/01 43/42.04 |
| 6,904,712 B1 | 6/2005 | Gironda | |
| 7,028,430 B2 | 4/2006 | Gironda | |
| 7,310,906 B1 | 12/2007 | Woller, Sr. | |
| 7,325,357 B2 | 2/2008 | Wiskur | |
| 7,562,489 B2 | 7/2009 | Turner | |
| 7,614,178 B2 | 11/2009 | Hoyt | |
| 7,712,245 B1 | 5/2010 | Jarboe | |
| 7,774,975 B2 | 8/2010 | Simmons et al. | |
| 7,827,730 B1 | 11/2010 | Jensen et al. | |
| 8,196,337 B2 | 6/2012 | Simmons | |
| 8,468,737 B2 | 6/2013 | Simmons | |
| 9,220,247 B2 * | 12/2015 | Goosey | A01K 85/01 |
| 2005/0150151 A1 * | 7/2005 | Wiskur | A01K 85/01 43/42.31 |
| 2005/0155273 A1 * | 7/2005 | Phipps | A01K 85/01 43/42.31 |
| 2009/0113783 A1 * | 5/2009 | Hollomon | A01K 85/01 43/42.31 |

* cited by examiner

*Primary Examiner* — Christopher P Ellis
(74) *Attorney, Agent, or Firm* — Cozen O'Connor (57) ABSTRACT

An artificial fishing lure having a hollow body wherein inside the hollow body is a sound plate, a clapper, and a clapper spring that provides sound and vibrations to the artificial fishing lure.

19 Claims, 10 Drawing Sheets

FISHING LURE

CROSS REFERENCE TO RELATED APPLICATION

This application claims priority to U.S. provisional application Ser. No. 61/967,390 filed Mar. 18, 2014, which is incorporated herein by reference in its entirety.

FIELD OF INVENTION

The present application is generally related to fishing lures, and in particular to lures having disposed within, a mechanism for creating sound and vibration to the lure.

BACKGROUND OF THE INVENTION

Fishing lures come in numerous shapes and sizes. Lures have metallic or reflective materials to stimulate the appearance of a fish, or other animal in an effort to entice a strike from another fish.

Other lures, in addition to having the appearance of a bait fish or other animal, have added ball bearings, or other materials to an interior chamber of the lure, so as to create sound waves that emanate from the lure as it is pulled through the water. The goal of such lure is to attract a fish to the lure.

In more recent years, lures have utilized electronic mechanisms to put out sound, lights, and vibrations in the water to try to incite a strike. For example, U.S. Pat. Nos. 2,116,994, 2,520,444, 2,563,522, 2,909,863, 3,172,227, 3,885,340, 3,896,580, 4,380,132, 4,453,335, 6,904,712, 7,028,430, 7,310,906, 7,325,357, 7,562,489, 7,614,178, 7,712,245, 7,774,975, 7,827,730, 8,196,337, 8,468,737, each provide an artificial fishing lure that incorporates some element aside from the shape of the lure, to aid in attracting a strike to the lure.

Ultimately, a successful lure catches fish. A more successful lure simply provides for more strikes than a less successful lure. Applicant has invented a novel artificial fishing lure that utilizes a fixed pole attached to an interior chamber of the lure, and attached over said fixed pole is a member having affixed a impacting device, which is capable of contacting the side of said interior chamber, producing a sound and a vibration to the artificial lure.

SUMMARY OF THE INVENTION

In accordance with these and other objects, a first embodiment of an invention disclosed herein is directed to an artificial fishing lure comprising: a body having a hollow portion, a clapper spring, a clapper, a sound plate, and a clapper base comprising an extrusion peg; wherein, the sound plate comprises a base having a hole, and two arms extending on opposing sides of said base, and wherein the hole engages the extrusion peg; and wherein the clapper is secured to one end of the clapper spring and the other end of the clapper spring is secured to the extrusion peg, wherein the sound plate is disposed of and secured between the clapper base and the clapper spring.

A further embodiment is directed to an artificial fishing lure comprising a hollow body having a top, bottom, and two sides, a clapper spring, a clapper, a clapper base having an extrusion peg, and at least one sound plate; wherein the at least one sound plate is secured to the interior of one side of the hollow body, and wherein the clapper base is secured within the hollow body, whereby the clapper spring secures to the extrusion peg and is disposed of inside the hollow body of the lure; wherein at the opposing end of the clapper spring is secured the clapper.

A further embodiment is directed to an artificial fishing lure kit comprising: an artificial lure comprising a hollow body, and a central body component defined to accept a clapper base; at least one clapper base comprising an extrusion peg; at least one clapper spring having a first end defined to secure to the extrusion peg and the other end defined to secure to a clapper; and at least one sound plate; wherein the at least one sound plate is configured to secure to the extrusion peg by being sandwiched between the clapper base and the clapper spring.

Additional features and embodiments will be apparent to one of ordinary skill in the art upon consideration of the following detailed description of preferred embodiments and descriptions of the best mode of carrying out the invention.

DETAILED DESCRIPTION OF THE PREFERRED EMBODIMENTS

The embodiments of the invention and the various features and advantages thereto are more fully explained with references to the non-limiting embodiments and examples that are described and set forth in the following descriptions of those examples. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims.

As used herein, terms such as "a," "an," and "the" include singular and plural referents unless the context clearly demands otherwise.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

Figure 1:
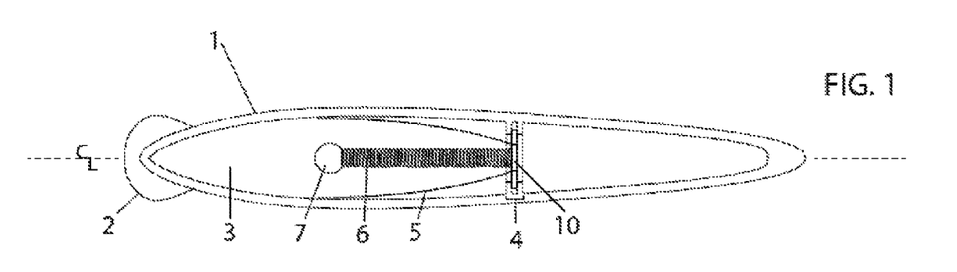
FIG. 1 provides a depiction of an artificial fishing lure from top down.

The present invention is related to an artificial fishing lure. For example, as depicted in FIG. 1, the fishing lure 1, which is depicted from the top down view and cut through the middle, contains an open or hollow body chamber 3. Within this hollow body chamber 3 are further secured the clapper 7 and the clapper spring 6. Much like a bell clapper, the clapper 7 is attached to the clapper spring 6 and is further secured to a clapper base 10 which is connected to the central body 4 of the artificial lure 1. As depicted in FIG. 1 a metal sound plate 5 attaches to the base of the clapper base 10 and is about centered, such that opposing sound plates 5 are positioned on two sides of the clapper 7.

When then artificial lure 1 move, the clapper 7 moves on the clapper spring 6 and the clapper 7 contacts the sound plate 5 creating a tone. Water is a fantastic medium to transmit sound, and so when the lure is utilized in water, the movement of the artificial lure 1, moves the clapper 7 and allows for the creation of tones when the clapper 7 contacts the sound plate 5.

Furthermore, as the clapper spring 6 is connected to the clapper base 10, vibrations created from the clapper spring 6 moving, which are transmitted to the entire body of the artificial lure 1 and provide vibrations into the water, which imitates, for example a live fish. The clapper moves based on movement of the lure, and based on the spring design can oscillate or move solely based on the movement of the lure. When the lure is pulled, creating movement in the clapper spring 6, but then the lure is let to be still in the water, the energy from the spring continues to provide vibrations to the lure, as would a live bait. This can be from oscillation or other movements of the clapper spring 6. Furthermore, vibrations are created by contact of the clapper 7 to the sound plate 5 or bod of the lure. Accordingly, the lure, through movement, creates both sound and vibrational waves to imitate a live bait.

Vibration is very important to imitating a live bait. When a live fly or insect falls on the water, there are typically small movements that create rings on the water. Fish are attracted to the rings, and the subtle movements continually put out additional rings. In a typical artificial lure, the lure does not move, and so while rings are initially created, there is little to no residual movement of the lure, making it look less life like. The clapper spring 6, by comparison, gains momentum through movement, and continues to move or oscillate within the hollow body of the lure. These residual movements provide for subtle movements, just like a live or dying insect, fish, frog, or other prey food.

Figure 2A:
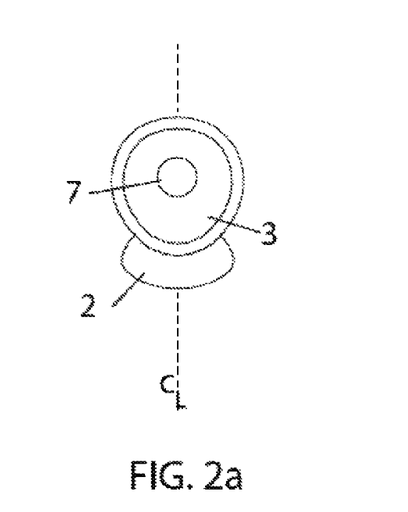
FIGS. 2a and 2b depict an artificial fishing sure from a side and front profile.
Figure 2B:
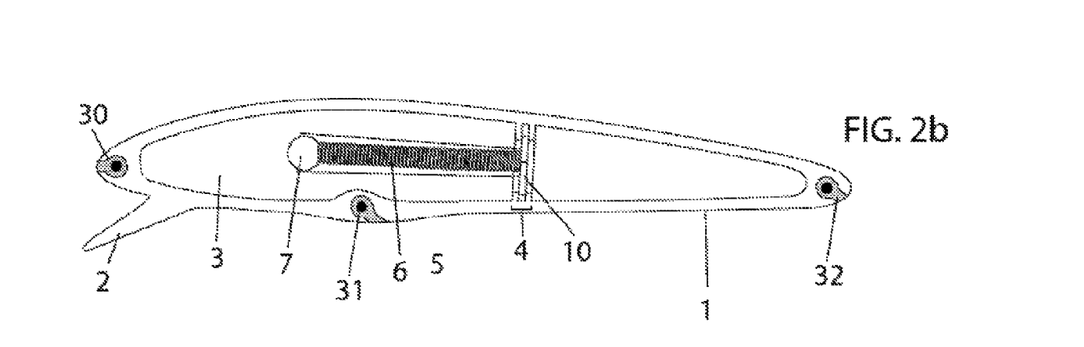

FIGS. 2a and 2b, depicts FIG. 1 from a front profile and a side cut-out profile. Further depicted are an eye 30, and hook attachment points 31 and 32. The bill 2 is also clearly depicted. The bill 2 is known to be used for different types of artificial lures, to aid in moving the artificial lure 1 to the appropriate depth in the water. Bill designs, as known to one of ordinary skill in the art are modified to have lures that dive deep, shallow, on the surface, and all levels in-between. The bill 2 can be modified in shape and size depending on the particular lure, the intended depth, as well as the intended movement. As is known to one of ordinary skill in the art, changing the angle of the bill 2, changing the shape, or changing the size, result in the lure responding differently as it is pulled through the water.

Figure 3:
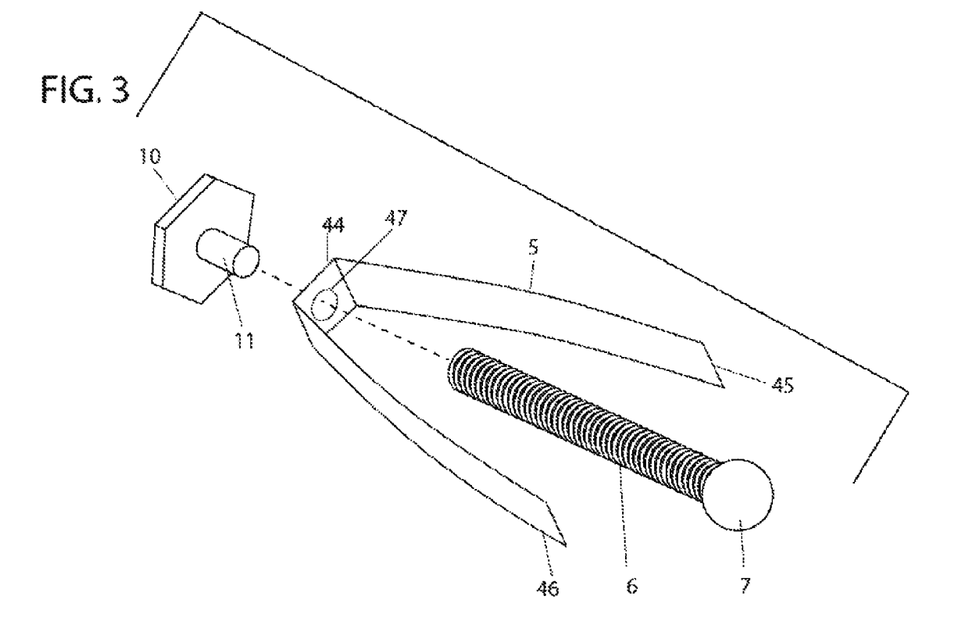
FIG. 3 depicts an exploded view of an embodiment a sound and vibration component of an artificial fishing lure.

FIG. 3 more particular defines the clapper 7 and its configuration and attachment to a body. The clapper base 10 comprises a centering extrusion peg 11 that provides a simple attachment mechanism to secure the clapper spring 6 to the clapper base 10. The clapper base 10 can then be secured to the central body 4, or other attachment point on the artificial lure 1. As shown in FIG. 3, in the exploded form, the clapper base 10 and the centering extrusion peg 11 first engage the metal sound plate 5, which has a sound base 44, with an opening 47 and a left and right arm 45 and 46. The opening 47 fits around the extrusion peg 11 and then the clapper spring 6 slides onto the extrusion peg 11, locking or fixing the sound plate 5 into place. The clapper spring 6 may be secured by friction alone to the extrusion peg 11, or with a physical or chemical adhesive or weld, or may include other attachment means or mechanisms such as grooves on the extrusion peg, a hole in the extrusion peg or a hole in the clapper base, to which a portion or a tail of the clapper spring 6 can secure to, or be attached to with any known attachment means. In some embodiments, the sound plate 5 is held so that the arms are secured to the base. In other embodiments, the sound plate 5 can rotate on the extrusion peg to allow the arms of the sound plate to move.

The clapper spring 6 is a compression spring. A compression spring is meant to be compressed, and thus the coils, when at rest, are not in contact with another coil. The clapper spring 6 has a coil pitch of about 0.005 to about 0.006 inches, a diameter of about 0.020 inches and about 25-32 coils. In preferred embodiments the clapper spring contains about 10-100 coils and a pitch is about 0.001 to about 0.5 inches. This allows for very small lures to be used in delicate fishing, as well as very large lures for large game fish in fresh, brackish, and salt water. Furthermore, the preferred diameter of the clapper spring is between 0.005 and 0.50. Again, this provides a range for small to large lures. The metal used in the clapper spring 6 is any one of ordinary copper, steel, or other common metal alloys that are ordinarily used in the art, or by another natural or synthetic material such as rubber or rubber like materials, epoxies, plastics, and combinations thereof.

Figure 9:
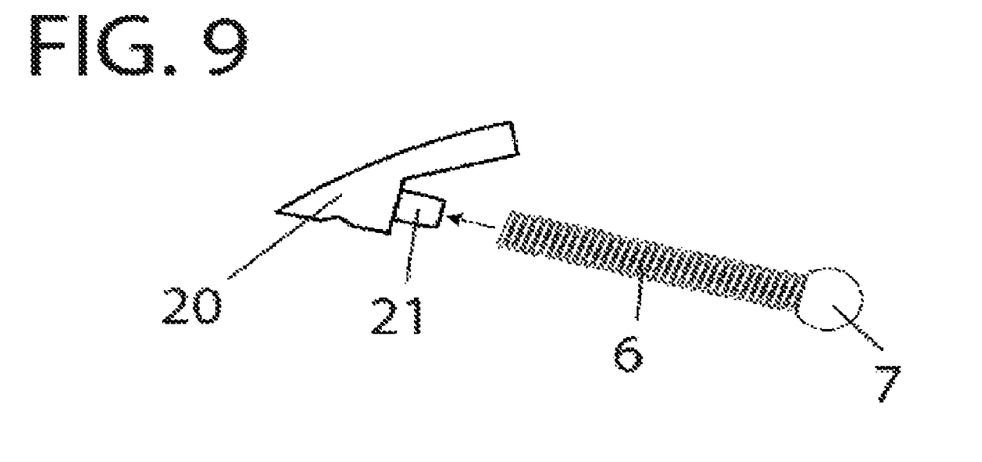
FIG. 9 depicts an embodiment of attaching a sound and vibration mechanism to an artificial fishing lure.

The size of the extrusion peg 11 or extrusion head peg 21 corresponds to the size of the clapper spring 6. The peg has an outer diameter that corresponds to the inner diameter of the clapper spring 6. As the inner diameter of the clapper spring 6 increases, the extrusion peg 11 or extrusion head peg 21 also increases in diameter. This allows for the clapper spring 6 to slide over and attach to the extrusion peg 11 for secure attachment.

By connecting the clapper spring 6 to the extrusion peg 11, the forces that are generated by the movement of the clapper spring 6 are then directed to the extrusion peg 11. This allows the forces and vibrations created by the movement of the clapper spring 6 to be directed to the extrusion peg 11 and to therefore extend into the body 4 of the artificial lure 1. The extrusion peg 11, therefore, centers the clapper spring 6 and the clapper 7 in about the center of the hollow body, but also provides for a mechanism to improve the transmission of these forces and vibrations from the clapper spring 6 to the body 4 to increase the vibrations to the artificial lure 1. Increase of vibrations makes the artificial lure 1 appear to be a live animal (possibly one that is dying), but aids in realism to the artificial lure 1 to increase the number of strikes to the artificial lure 1.

The metal sound plate 5 contains the left and right arms 45 and 46. These arms extend into the hollow cavity of the lure 1 and provide a contact point for the clapper 7. In certain embodiments, the arms 45 and 46 are intended to be held within the hollow cavity of the lure and not touch the sides of the lure. This allows for greater tones to be created, as these arms essentially form a bell. The sound base 44 and hole 47 further take the vibrational energy created when the clapper 7 hits the arms 45 and 46 and transfers it to the body of the lure.

However, in certain embodiments, the arms 45 and 46 are in contact with the inside walls of the lure. This allows for creation of a tone, even if slightly muted, and also for transfer of vibrations to the side of the lure as well as into the sound base 44. In further embodiments, the arms 45 and 46 may contact the inside walls of the lure only when the clapper 7 provides enough energy to move the arms sufficiently to then contact the inside walls of the hollow cavity of the lure.

Figure 4:
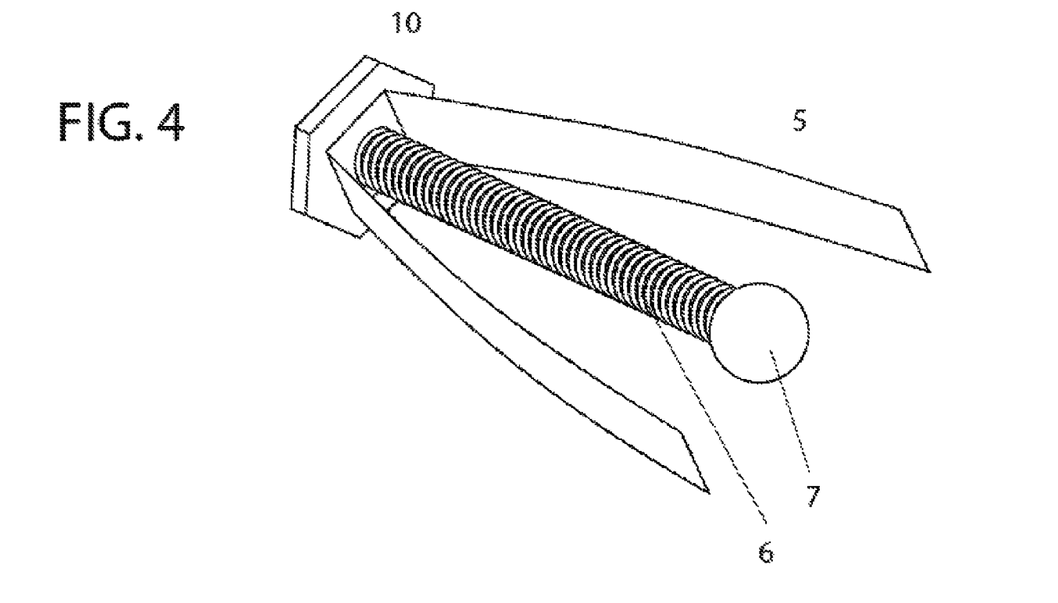
FIG. 4 depicts a view of an embodiment a sound and vibration component of an artificial fishing lure.
Figure 5A:
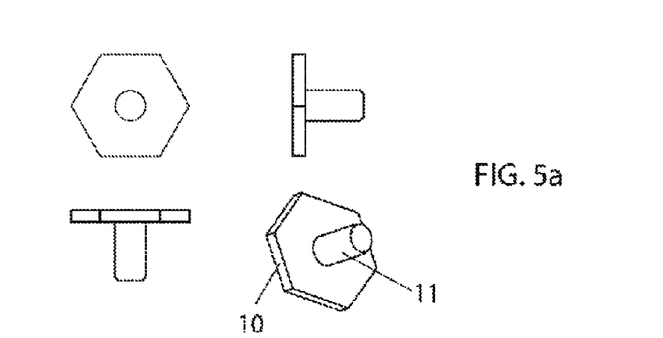
FIGS. 5a, 5b, 5c, and 5d depict views of various embodiment of a sound and vibration component of an artificial fishing lure.
Figure 5B:
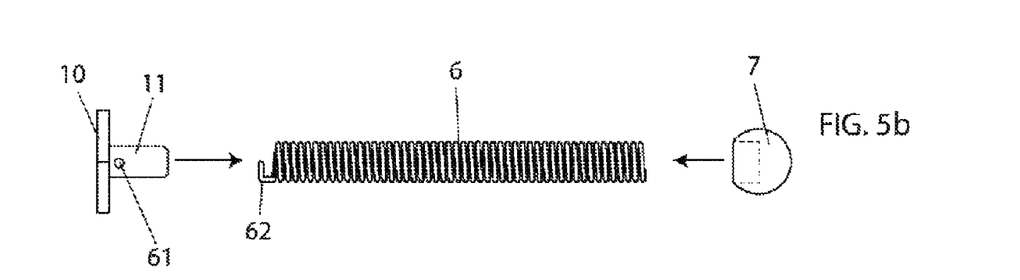
Figure 5C:
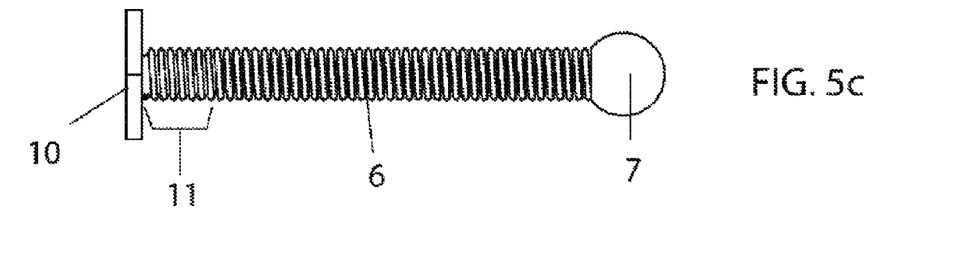
Figure 5D:
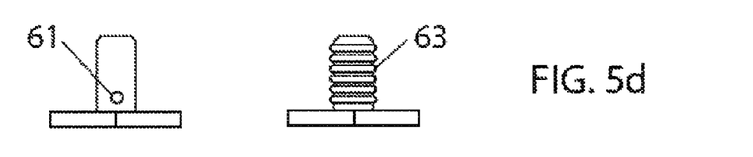

FIG. 4 provides a depiction of FIG. 3 in a non-exploded form, so that the arrangement of the components is appropriately visualized. In particular, the clapper 7 does not extend past the metal sound plate 5. This is necessary so that as the clapper 7 moves back and forth, it contacts the arms of the metal sound plate 5 and creates a tone.

FIGS. 5a, 5b, 5c, and 5d depict means for attachment between the clapper spring 6, the clapper 7, and to the extrusion peg 11. As depicted in the exploded view of FIG. 5A, the clapper 7 attaches to one end of the clapper spring 6. In a preferred embodiment, the clapper 7 has a hollowed out portion (depicted by the dashed lines), in the center of the clapper 7, one side, that is of appropriate size to then slide over the clapper spring 6. Attachment is then via adhesive, weld, or other mechanical, or chemical attachment mechanism. The opposing end of the clapper spring 6 slides over the extrusion peg 11 and is also attached via adhesive, weld, or other mechanical attachment mechanism. In each case, the clapper 7 or the extrusion peg, may also have a hole 61, having a similar diameter as the wire of the clapper spring 6, and wherein the clapper spring 6 has a tail 62 that secures to a hole in the extrusion peg 11 or in the clapper 7 itself. The tail 62 is a loop, partial loop, hook, half hook, "Y", etc., as is known in the art, that can secure to the hole 61 in the extrusion peg. Alternatively, the bottom coil can be secured through the hole 61. Another attachment means utilizes screw threads 63, having a corresponding diameter and pitch to attach to a corresponding clapper spring 6. A further embodiment is simple ridges, and not a helical screw thread system. Adhesives, welding, or other mechanical or chemical attachment means can be utilized alone, or in combination with any of the hole 61, threads 63, or smooth extrusion peg 11 to secure the clapper spring 6 to the extrusion peg 11.

Figure 6A:
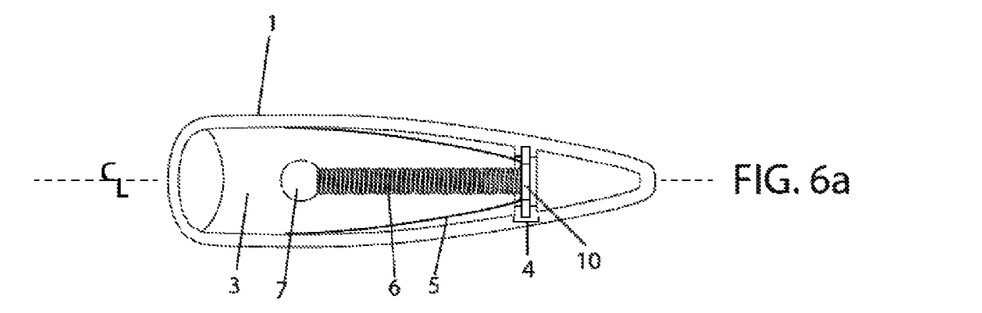
FIGS. 6a, 6b, and 6c depict an embodiment of an artificial fishing lure.
Figure 6B:
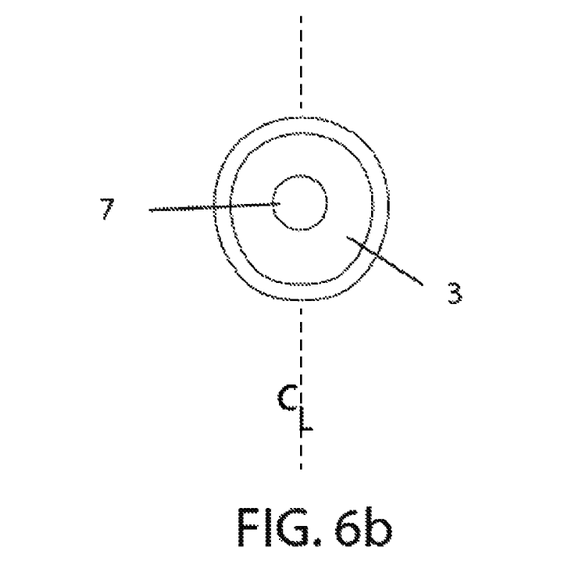
Figure 6C:
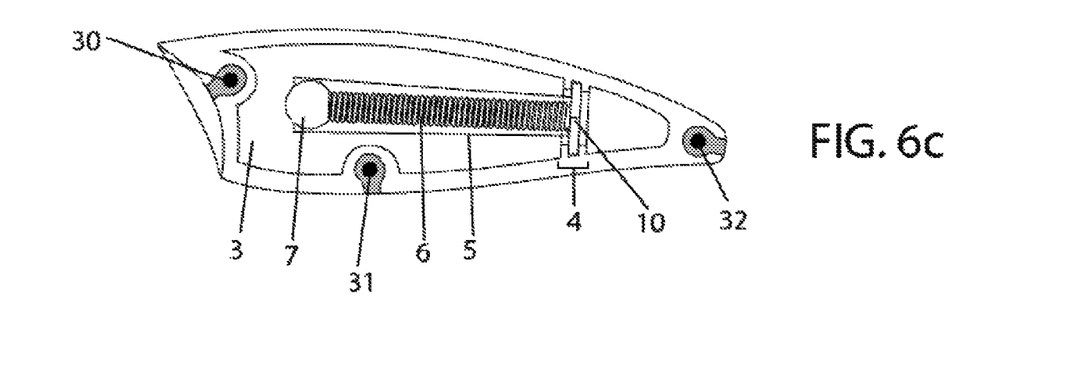

FIGS. 6a, 6b, and 6c depict an embodiment of an artificial lure 1 that is depicted as a surface popper type artificial lure design, shown from the top, side, and front of the artificial lure 1.

Figure 7A:
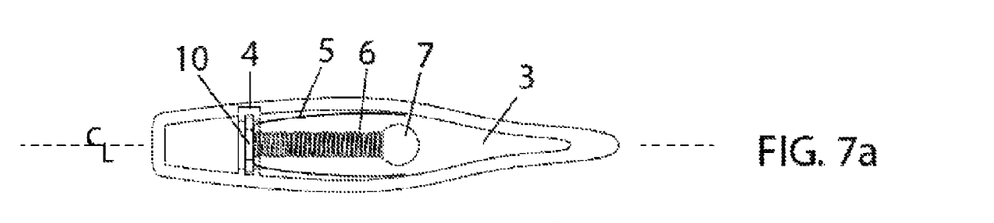
FIGS. 7a, 7b, and 7c depict an embodiment of an artificial fishing lure.
Figure 7B:
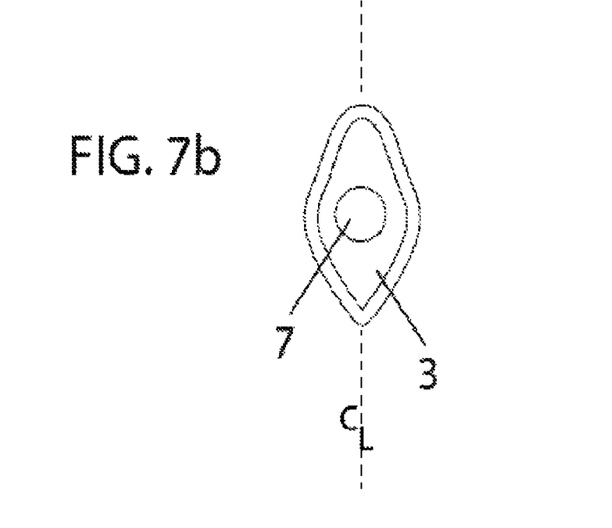
Figure 7C:
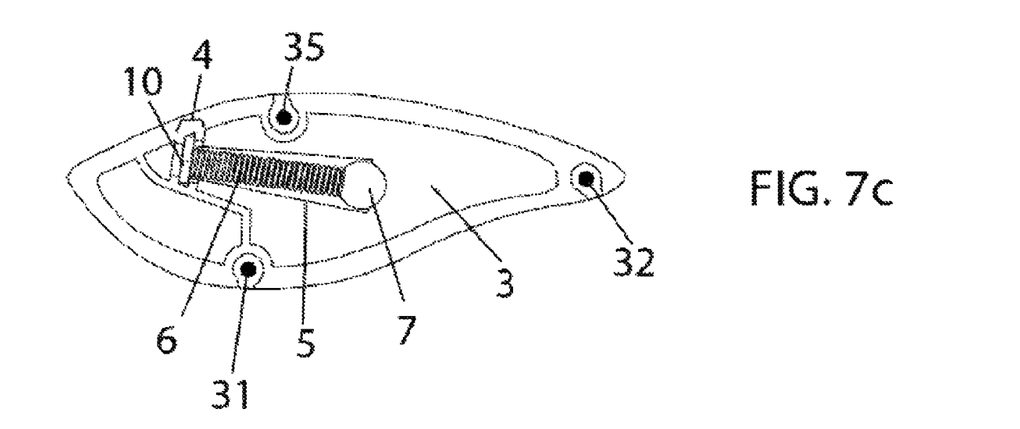

FIGS. 7a, 7b, and 7c depict an embodiment of an artificial lure 1 that depicts a crank bait style artificial lure. As compared with other embodiments, the clapper 7 and other components, the front body 14 provides the connection point for the clapper base 10. Similarly, the rear body chamber 13 provides that the clapper 7 faces backwards as compared to other embodiments. Accordingly, the orientation of the clapper 7 is immaterial and can face forwards or backwards in various embodiments. The front body 14, therefore, functions like the center body 4 in other embodiments. Depicted are hook attachment points 31 and 32. Further depicted is a line attachment point 35. In each embodiment, a point exists on the artificial lure so that a fishing line can be attached to the artificial lure, as known to one of ordinary skill in the art.

Figure 8A:
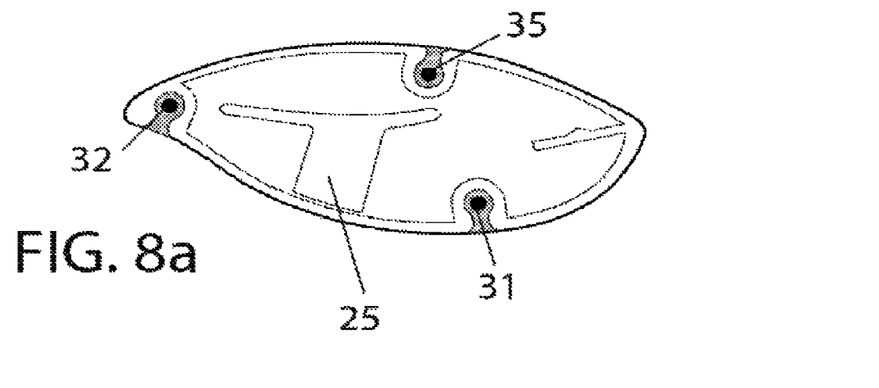
FIGS. 8a, 8b, and 8c depict a further embodiment of an artificial fishing lure.
Figure 8B:
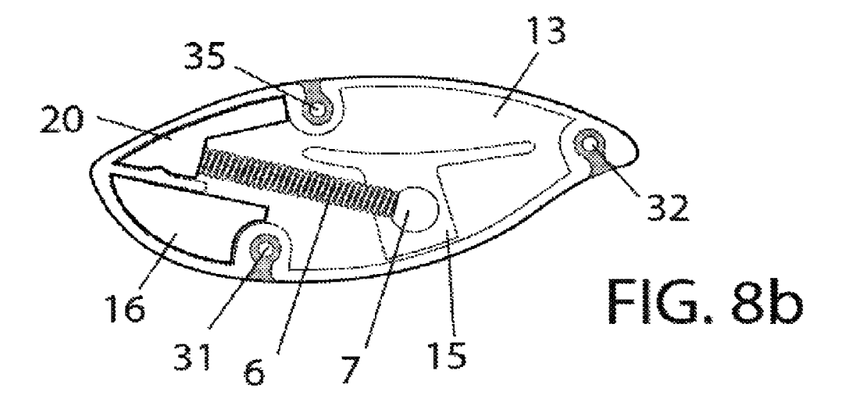
Figure 8C:
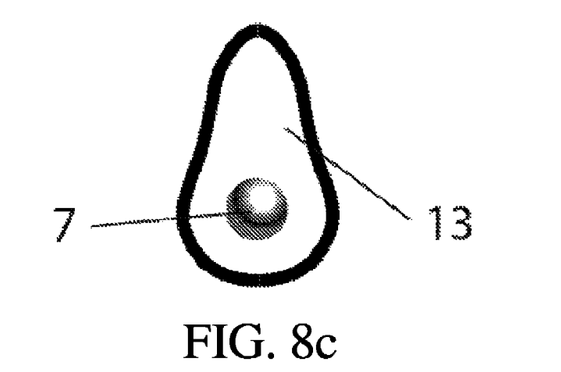

FIGS. 8a and 8b depict a left and right half of a separate embodiment of an artificial lure. Here the sound plates 15 and 25 are attached to the side of the interior chamber 13. The sound plates 15 and 25 can be attached with an adhesive or other attachment means. However, it is also contemplated that the sound plates 15 and 25 are attached into a recessed space in the side walls of the interior chamber 13. This recessed space is of the size and shape of the sound plates, and allows for simple securing of the sound plate to the interior wall of the lure. As the sound plates are thin, the recessed amount is typically about 0.1 to about 3 mm in depth. The sound plates 15 and 25 can be the same shape, or have different shapes and be of different materials to create different tones. Furthermore, by striking the side wall of the interior chamber 13, the clapper 7 provides direct forces to the side of the artificial lure 1 thus creating vibrations to the artificial lure 1 that are passed into the water. Accordingly, vibrations and sound waves are passed into the water to attract a strike to the artificial lure 1.

FIG. 9 details an attachment head 20 having an extrusion head peg 21 that serves to hold the clapper spring 6, in the appropriate location in the body of the artificial lure. The attachment head 20 is situated to accept vibration and sound waves from the clapper spring 6 and project them into the water and functions like the clapper base 10. The extrusion head peg 21 functions like the extrusion peg 11 in securing the clapper spring to another component.

Figure 10A:
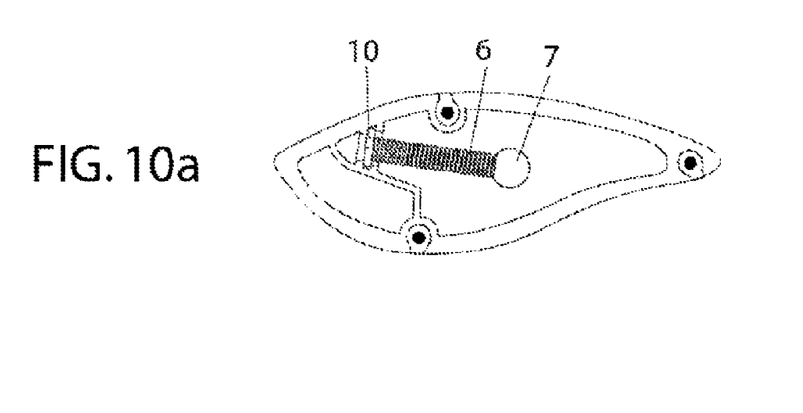
FIGS. 10a, 10b, and 10c depict further embodiments of artificial fishing lures.
Figure 10B:
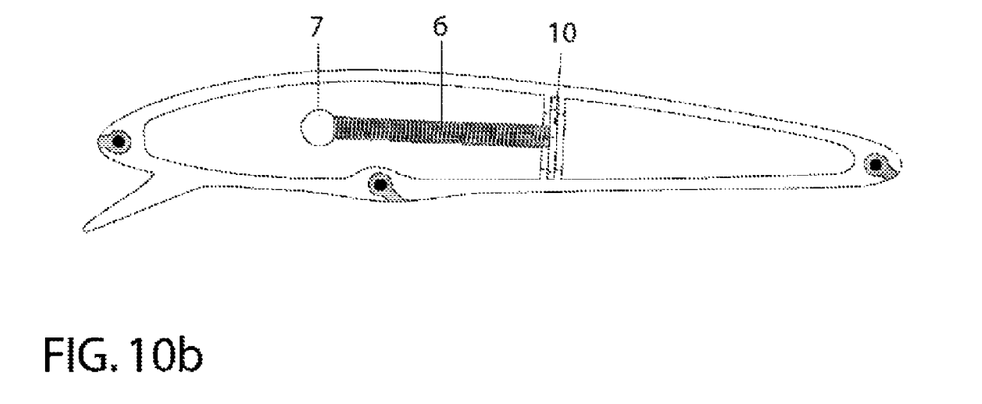
Figure 10C:
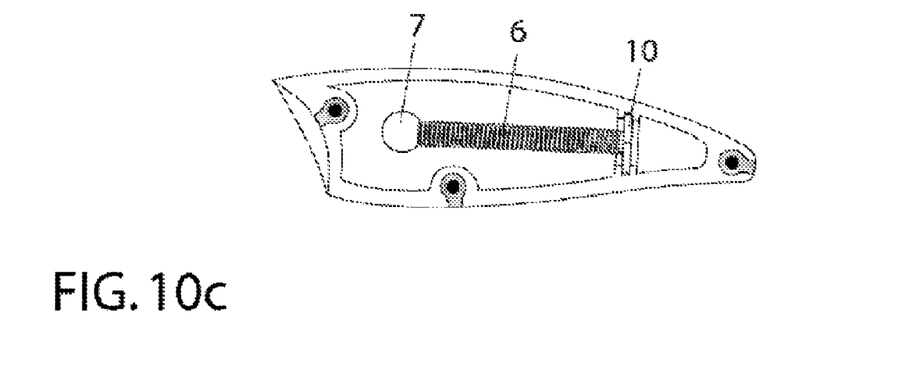

FIGS. 10a, 10b, and 10c depict various embodiments shown from a side profile of several artificial lure patterns where no metal plate or mechanism, is provided other than the clapper 7, the clapper spring, an extrusion peg 11 or head peg 21, and an attachment head 20 or a base 10. Accordingly, the clapper 7 is free to move within the body of each artificial lure and contact the inside walls of the chambers creating tones and vibrations that are passed into the water. Tones and vibrations are created from the clapper 7 to the body of the lure.

Lures are described and shown as typical bait fishing lures, however, any number of additional shapes and sizes are considered herein. Small and large flies or flying insects, beetles, mice, frogs, crawfish, fish, swimming insects and the like can be utilized with the artificial lures described herein.

It is conceived that a kit may be utilized wherein various tone plates are provided, such that a user can remove or change the tone with another plate to create a different tone. This provides that the artificial lure has replaceable or interchangeable tone plates, so that a user can modify and select the best tone for the particular water or the particular bait that they are attempting to imitate.

A further embodiment of a kit comprises at least two different clapper springs. The clapper springs may have different lengths, and different rigidity. By having shorter or longer lengths, the tones and vibrations created are different. Furthermore, more rigid springs require more force to create a tone, but also impart greater forces when the clapper 6 impacts any of the various sound plates. A further component of the kit would be matching clapper bases, having extrusion pegs 11 that correspond to the various clapper springs provided in the kit.

Therefore, a kit may comprise several different style artificial lure bodies, several clapper springs 6, several clappers 7, corresponding clapper bases 10, and several different sound plates. Accordingly, a user can customize the size, shape, feel, tones, vibrations, etc. created by the lure.

Therefore, it is further considered that the lure body comprises a left and a right half that are intended to be paired, and when paired can be selectively secured together to substantially prevent water from entering the hollow body. Substantially, meaning that some small amounts of water may leak into the body during use, but that the lure is water tight when place under pressure at about 5 feet under water. The left and right half may comprise any number of latching mechanisms to secure to one another, and include a sealing gasket to prevent water entry.

In other embodiments, the kit includes an adhesive to allow for the user to seal the left and right half wherein the adhesive is permanent. Thus, once a lure is created by the user, it cannot be further modified.

Having now fully described this invention, it will be understood to those of ordinary skill in the art that the methods of the present invention can be carried out with a wide and equivalent range of conditions, formulations, and other parameters without departing from the scope of the invention or any embodiments thereof.

What is claimed is:

1. An artificial fishing lure comprising:
   a. a body having a hollow portion, a clapper spring, a clapper, a sound plate, and a clapper base comprising an extrusion peg;
   b. wherein the sound plate comprises a base having a hole and two arms extending on opposing sides of said base, and wherein the hole engages the extrusion peg; and
   c. wherein the clapper is secured to one end of the clapper spring, and the other end of the clapper spring is secured to the extrusion peg, wherein the sound plate is disposed of and secured between the clapper base and the clapper spring.

2. The artificial lure of claim 1 further comprising a central body wherein the central body is configured to accept the clapper base.

3. The artificial lure of claim 2 wherein securing the clapper base to the central body aligns the clapper to be positioned centrally inside the hollow portion of the artificial lure.

4. The artificial lure of claim 1 wherein the clapper is positioned between, but not in contact with, the arms of the sound plate.

5. The artificial lure of claim 1 wherein the clapper spring is a compression spring.

6. The artificial lure of claim 1 wherein the clapper spring has between 25 and 32 coils.

7. The artificial lure of claim 1 wherein the wire diameter of the clapper spring is about 0.020 inches.

8. An artificial fishing lure comprising a hollow body having a top, bottom, and two sides, a clapper spring, a clapper, a clapper base having an extrusion peg, and at least one sound plate; wherein the at least one sound plate is secured to the interior of one side of the hollow body, and wherein the clapper base is secured within the hollow body, whereby the clapper spring secures to the extrusion peg and is disposed of inside the hollow body of the lure; wherein at the opposing end of the clapper spring is secured the clapper.

9. The artificial lure of claim 8 comprising two sound plates.

10. The artificial lure of claim 8 wherein the sound plate is secured to a side wall within in the hollow body.

11. The artificial lure of claim 8 further comprising two sound plates, wherein one sound plate is secured to each of the two sides, and wherein each sound plate produces a different tone.

12. The artificial lure of claim 8 wherein the sound plate is secured to an indentation in the side wall.

13. The artificial lure of claim 8 wherein the first sound plate is secured to a side wall within the hollow body and further comprising a second sound plate, wherein the second sound plate comprises a sound plate base, a hole in said sound plate base, and two arms, wherein the second sound plate is positioned such that the hole in the sound plate base is positioned over the extrusion peg and in contact with the clapper based on one side of the sound plate base and secured by the clapper spring on the other side.

14. An artificial fishing lure kit comprising:
   a. an artificial lure comprising a hollow body and a central body component defined to accept a clapper base;
   b. at least one clapper base comprising an extrusion peg;
   c. at least one clapper spring having a first end defined to secure to the extrusion peg and the other end defined to secure to a clapper; and
   d. at least one sound plate; wherein the at least one sound plate is configured to secure to the extrusion peg by being sandwiched between the clapper base and the clapper spring.

15. The kit of claim 14 further comprising at least two clapper springs, wherein the user can modify the tone and vibrations of the artificial lure by changing the clapper spring utilized in the artificial lure.

16. The kit of claim 14 further comprising at least two sound plates, wherein the user can determine whether to use 0, 1, or 2 sound plates in the lure.

17. The kit of claim 14 further comprising at least two clapper bases, at least two clapper springs, and at least two sound plates; wherein the at least two clapper bases are defined with an extrusion peg to match the diameter of the two different clapper springs, and wherein the user can customize the artificial lure by interchanging the clapper springs and sound plates to modify the sound and vibrations of the artificial lure.

18. The kit of claim 14 wherein said hollow body comprises a left and a right half designed to selectively secure to one another to allow for repeated opening and closing of the two halves to allow for modification of the clapper spring, clapper, or sound plates within the artificial lure.

19. The kit of claim 14 wherein said hollow body comprises a left and a right half designed to secure to one another to allow for individual selection of a clapper spring, clapper, and sound plate within the artificial lure.

* * * * *